Nov. 17, 1964 J. T. VOSBIKIAN 3,157,017
SHEARS WITH SUPPORTING WHEEL
Filed Dec. 18, 1962
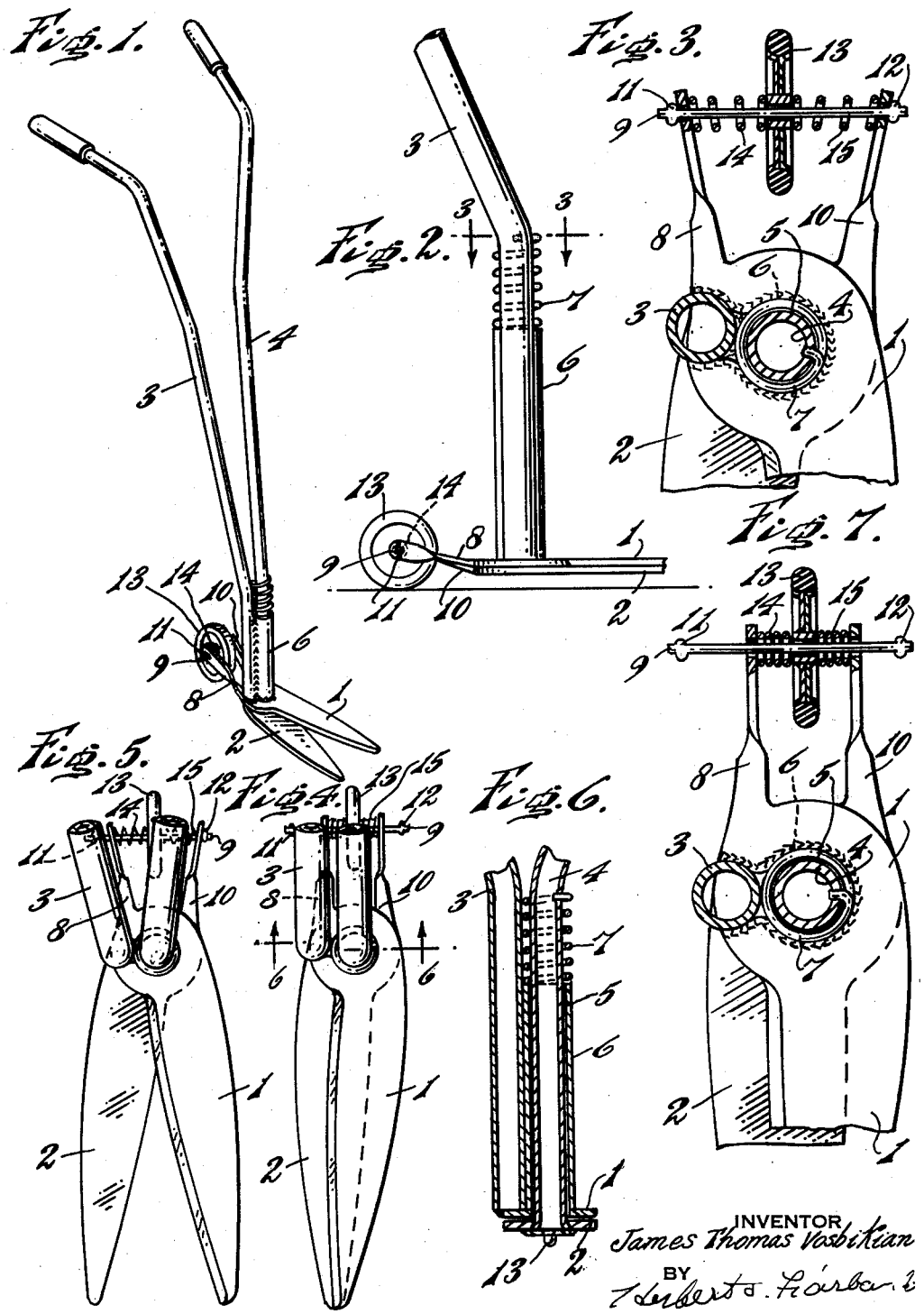
INVENTOR
James Thomas Vosbikian
BY
Herbert T. Fairbanks
ATTORNEY

United States Patent Office 3,157,017
Patented Nov. 17, 1964

3,157,017
SHEARS WITH SUPPORTING WHEEL
James Thomas Vosbikian, 20th and Oxford Sts.,
Philadelphia, Pa.
Filed Dec. 18, 1962, Ser. No. 245,622
1 Claim. (Cl. 56—241)

The object of this invention is to devise a novel construction of shears having a wheel support so that it can be rolled along a surface during a cutting or trimming operation with the operator controlling the shears while standing or walking in an upright position.

A further object of the invention is to devise a novel manner of mounting the blades, a novel manner of connecting them with a pair of handles and with a supporting wheel having a novel mounting on the blades.

A further object is to have the wheel loosely mounted on a shaft coaxially mounted in a rear extension of the blades and provided with novel tensioning means tending to maintain the wheel in a central position relatively to the blades.

A further object is to have the wheel supporting means limiting the extent of the opening movement of the blades.

In a copending application Serial No. 244,807, filed December 14, 1962, I have described and broadly claimed the blade mounting and the blade connection with the handles, and the present application includes a novel wheel mounting carried by the blades.

With the foregoing and other objects in view as will hereinafter clearly appear, my invention comprehends novel shears and a novel wheel mounting carried by the blades so that the shears can be rolled along a surface as, for example, a lawn, the grass of which is to be cut and trimmed.

It further comprehends a novel construction of the component parts.

FIGURE 1 is a perspective view of shears with a supporting wheel embodying my invention.

FIGURE 2 is a side elevation, partly broken away.

FIGURE 3 is a top plan view on an enlarged scale, with the blades shown in open position, and the handles in section, the section being taken substantially on line 3—3 of FIGURE 2.

FIGURE 4 is a top plan view showing the shears in closed position, with the handles broken away.

FIGURE 5 is a view similar to FIGURE 4, with the blades shown in open position.

FIGURE 6 is a section on the line 6—6 of FIGURE 4.

FIGURE 7 is a top plan view on an enlarged scale, similar to FIGURE 3, but showing the blades in closed position.

For the purpose of illustrating the invention, I have shown in the accompanying drawings a preferred embodiment of it, which in practice will give reliable and satisfactory results. It is, however, to be understood that I am not limited to the precise arrangement of the instrumentalities described herein, except by the scope of the appended claim.

Similar numerals of reference indicate corresponding parts.

Referring to the drawings, the shears have a top blade 1 and a bottom blade 2, and a right and left handle 3 and 4 respectively. The handles are deflected rearwardly at their forward portions, then their upper ends are deflected laterally and terminate in grasping portions. The handles are preferably tubular and the right handle is fixed to the top blade, for example, by welding.

The left handle passes through a bore 5 in a lateral extension 6 of the right handle and is fixed at its forward end to the bottom blade 2. It will thus be seen that the left handle in effect, passes through the right handle and the extension is fixedly connected with the right handle, for example, by welding.

A spring 7 having one end fixed to the left handle bears against the extension to tension the blade by tending to move the bottom blade against the top blade. The top blade 1 has a rearwardly extending strip 8 which is twisted to adapt it to receive a shaft 9. The bottom blade 2 has a rearwardly extending strip 10 which is twisted to adapt it to receive a shaft 9. This shaft is free to rotate and to move longitudinally through the strips, but exterior of the strips the shaft has enlargements 11 and 12 at its ends which limit the extent of opening movement of the blades.

A supporting wheel 13 is free to rotate on the shaft and for longitudinal movement along the shaft, and on the shaft at opposite sides of the wheel are springs 14 and 15 which tend to retain the wheel in its central position and move the end extensions of the blades in their open positions.

The construction and arrangement of the handles, blades and the tensioning means of the blades is described and broadly claimed in my copending application Serial No. 244,807, filed December 14, 1962, and the invention is directed in this application to the supporting wheel and its mounting on the blades and such combination.

In the operation, when either handle is moved toward the other handle, or when the handles are moved toward or away from each other, the cutting operation is effected. When one handle is moved toward the other handle, or both handles are moved toward each other, the blades close and the springs on the shaft are compressed, and the wheel is maintained in its central position. On the opening movement of the blades the springs expand until the strips contact the enlargements at the end of the shaft and exterior of the strips and effect the opening movement of the blades.

Having thus described my invention, what I claim as new and desire to secure by Letters Patent is:

A grass trimmer and edger, comprising handles bodily and laterally movable towards and away from each other, a body portion containing one handle, said body portion having a sleeve laterally spaced from the first handle and containing the other handle, shears, each fixedly connected to the lower end of the handles, a spring acting against the sleeve and the handle within such sleeve, to maintain the blades in frictional engagement, a shaft extending through the rear ends of the shears, having enlarged ends to limit opening movement of the shears, a wheel rotatably mounted and longitudinally movable on said shaft, and springs between the wheel and the shears, tending to maintain the shears in open position.

References Cited by the Examiner
UNITED STATES PATENTS

| | | | |
|---|---|---|---|
| 1,656,923 | 1/28 | Seme | 30—261 X |
| 1,845,798 | 2/32 | Keiser | 30—261 X |
| 2,109,623 | 3/38 | O'Sullivan | 56—241 |
| 2,712,721 | 7/55 | Gosparlin | 56—241 |

T. GRAHAM CRAVER, *Primary Examiner.*
ANTONIO F. GUIDA, ARNOLD RUEGG, *Examiners.*